(12) United States Patent
Chung et al.

(10) Patent No.: US 12,509,727 B2
(45) Date of Patent: Dec. 30, 2025

(54) COMPOSITION FOR DIAGNOSIS OF SJÖGREN'S SYNDROME

(71) Applicant: THE CATHOLIC UNIVERSITY OF KOREA INDUSTRY-ACADEMIC COOPERATION FOUNDATION, Seoul (KR)

(72) Inventors: So-Hyang Chung, Seoul (KR); Hyun-Jung Lee, Seoul (KR)

(73) Assignee: THE CATHOLIC UNIVERSITY OF KOREA INDUSTRY-ACADEMIC COOPERATION FOUNDATION, Seoul (KR)

(*) Notice: Subject to any disclaimer, the term of this patent is extended or adjusted under 35 U.S.C. 154(b) by 397 days.

(21) Appl. No.: 16/314,798

(22) PCT Filed: Feb. 12, 2018

(86) PCT No.: PCT/KR2018/001815
§ 371 (c)(1),
(2) Date: Jan. 2, 2019

(87) PCT Pub. No.: WO2018/164385
PCT Pub. Date: Sep. 13, 2018

(65) Prior Publication Data
US 2019/0382840 A1    Dec. 19, 2019

(30) Foreign Application Priority Data
Mar. 7, 2017   (KR) .................. 10-2017-0028783
Feb. 9, 2018   (KR) .................. 10-2018-0016090

(51) Int. Cl.
*C12Q 1/6883* (2018.01)
*G16H 50/30* (2018.01)

(52) U.S. Cl.
CPC .......... *C12Q 1/6883* (2013.01); *G16H 50/30* (2018.01); *C12Q 2600/118* (2013.01); *C12Q 2600/136* (2013.01); *C12Q 2600/158* (2013.01)

(58) Field of Classification Search
CPC .............................. C12Q 1/6883; G16H 50/30
See application file for complete search history.

(56) References Cited

U.S. PATENT DOCUMENTS

| | | | | |
|---|---|---|---|---|
| 9,572,820 B2* | 2/2017 | Deretic | ............ | G01N 33/6893 |
| 2009/0087429 A1* | 4/2009 | Chen | .................. | C12N 15/1136 |
| | | | | 530/387.3 |
| 2012/0238566 A1* | 9/2012 | Jiang | ....................... | A61P 43/00 |
| | | | | 514/233.5 |
| 2014/0135296 A1* | 5/2014 | Deretic | ................. | A61K 31/585 |
| | | | | 514/263.34 |
| 2014/0314715 A1 | 10/2014 | Baban et al. | | |
| 2015/0233930 A1* | 8/2015 | Speicher | ............ | G01N 33/5743 |
| | | | | 514/313 |
| 2015/0273083 A1 | 10/2015 | Chiorini et al. | | |
| 2016/0024580 A1 | 1/2016 | Masli | | |

OTHER PUBLICATIONS

Katsiougiannis et al. "Endoplasmic reticulum stress causes autophagy and apoptosis leading to cellular redistribution of the autoantigens Ro/Sjogren's syndrome-related antigen A (Ssa) and La/SSB in salivary gland epithelial cells", Clin Exp Immunol. Aug. 2015;181(2):244-52 (Year: 2015).*
Ma et al. "Dry eye management in a Sjogren's syndrome mouse model by inhibition of p38-MAPK pathway", Diagn Pathol. Jan. 20, 2014;9:5. (Year: 2014).*
Alessandri C, Ciccia F, Priori R, et al. "SAT0378 Autophagy is Up-Regulated in the Salivary Glands of Primary Sjogren's Syndrome Patients and Correlates with the Focus Score and Disease Activity", Annals of the Rheumatic Diseases 2015;74:796. (Year: 2015).*
Ohashi et al. "Abnormal protein profiles in tears with dry eye syndrome", Am J Ophthalmol. Aug. 2003;136(2):291-9. (Year: 2003).*
Mizushima et al. "Methods in Mammalian Autophagy Research", Cell. Feb. 5, 2010; 140(3): 313-326 (Year: 2010).*
Castagnola et al. "Identification of an HSP90 modulated multi-step process for ERBB2 degradation in breast cancer cells", Oncotarget. 2016; 7:85411-85429 (Year: 2016).*
Morgan-Bathke et al. "Deletion of ATG5 shows a role of autophagy in salivary homeostatic control", J Dent Res. Oct. 2013;92(10): 911-7 (Year: 2013).*
Tsujimoto et al. "Another way to die: autophagic programmed cell death", Cell Death Differ. Nov. 2005;12 Suppl 2:1528-34. (Year: 2005).*
Seo, Yu Ri et al., "Transmission Electron Microscopic Findings of Lacrimal Gland Acinar Cells Induced by In Vivo Dry Eye," Journal of the Korean Opthalmological Society, vol. 55, No. 8, pp. 1187-1194, 2014.
Chinskey, Nicholas D. et al., "Control of Photoreceptor Autophagy After Retinal Detachment: The Switch From Survival to Death," IOVS, vol. 55, No. 2, pp. 688-695, Feb. 2014.
Byun, Yong-Soo et al., "Elevation of autophagy markers in Sjogren syndrome dry eye," Scientific Reports, vol. 7, No. 17280, pp. 1-11, 2017.

* cited by examiner

Primary Examiner — Daniel E Kolker
Assistant Examiner — Peter Johansen
(74) *Attorney, Agent, or Firm* — Sughrue Mion, PLLC

(57) ABSTRACT

The present invention provides a composition for diagnosing Sjögren's syndrome in dry eye syndrome by using ATG5 or LC3B-II as a biomarker, a method of diagnosing the same, and a screening method. ATG5 or LC3B-II are used as a biomarker to effectively diagnose only Sjögren's syndrome except for non-Sjögren's syndrome in dry eye syndrome, and thus it can be useful for related fields.

5 Claims, 9 Drawing Sheets

NOD/LtJ mice

IκB-ζ deficient mice

COMPOSITION FOR DIAGNOSIS OF SJÖGREN'S SYNDROME

PRIORITY

This present application is a National Phase application under 35 U.S.C. § 371 of International Application No. PCT/KR2018/001815, filed Feb. 12, 2018, which claims priority to Korean Patent Application No. 10-2017-0028783 filed Mar. 7, 2017, and Korean Patent Application No. 10-2018-0016090 filed Feb. 9, 2018, entire contents of which are incorporated herein by reference.

BACKGROUND OF THE INVENTION

Technical Field of the Invention

The present invention relates to a composition, a kit, and a method for diagnosis of Sjögren's syndrome in dry eye syndrome and a screening method using a biomarker. More particularly, the present invention uses ATG5 or LC3B-II as a biomarker to diagnose only Sjögren's syndrome in dry eye syndrome effectively.

Description of the Related Art

Sjögren's syndrome is a systemic autoimmune disease of the exocrine gland, which may exist as a primary disease or as a secondary disease for other well-known autoimmune diseases such as rheumatoid arthritis, systemic lupus erythematosus, systemic scleroderma and polymyositis. Their characteristics include not only dry eye syndrome but also lymphocytic infiltration of the exocrine gland and mucosal epithelium, which cause hydrodipsomania. The pathologic mechanism of Sjögren's syndrome leads to severe dry eye syndrome compared with dry eye syndrome associated with non-Sjögren's syndrome.

In particular, the dry eye syndrome is a multifactorial disease of the tear and ocular surface that causes discomfort, visual disturbance, and tear film instability that may potentially damage the ocular surface. This provides increased osmolarity of the tear film and inflammation of the ocular surface. The causes of the dry eye may be classified into non-Sjögren's syndrome which induces general dry eye and Sjögren's syndrome. The non-Sjögren's syndrome includes diseases that cause the tear gland disease, the lacrimal duct closure, and the reflex tear reduction.

Their common features are the lack of "basal tears" to protect their eyes. In the non-Sjögren's syndrome, eyes are protected by "reflex tear" stimulated by dryness of the eyes (lack of basal tear) or by the external environment. In other words, although "basal tear" is lacking to cause eye damage, "reflex tear" plays a complementary role. On the other hand, the Sjögren's syndrome lacks the "basal tear" of the cornea and does not secrete "reflex tear" even when the eye is stimulated by the external environment. Thus, it causes severe damage on the ocular surface compared with non-Sjögren's syndrome.

Recent studies have reported that improved autodigestion and apoptosis are associated with Ro/SAA and La/SSB redistribution in the secretory epithelial cells of the salivary glands. At the cellular level, after the local production and secretion of autologous antibodies, re-localization of autoantigen onto the cell surface is followed quickly. Autodigestion is lysosome-mediated catabolism that maintains cellular homeostasis through the degradation and reuse of cellular components and cellular organelles. In addition to their traditional role in response to cell stress, the autodigestion is related to the onset of autoimmune disease. In the immune system, autodigestion controls procedures such as antigen uptake and presentation, removal of pathogens, survival of short- and long-living immune cells, and cytokine-dependent inflammation. Recent studies have reported that polymorphism in autodigestion-related genes is associated with susceptibility to systemic lupus erythematosus and Crohn's disease.

Therefore, the present inventors have found that the discovered biomarkers, ATG5 and LC3B-II known as autodigestion markers can accurately diagnose only Sjögren's syndrome in dry eye syndrome, thereby completing the present invention.

DETAILED DESCRIPTION

Technical Problem

It is an aspect of the present invention to diagnose Sjögren's syndrome effectively in dry eye syndrome by using ATG5 or LC3B-II as a biomarker.

Technical Solution

To achieve the above aspect, a first aspect of the present invention provides a composition for diagnosing Sjögren's syndrome in dry eye syndrome, which includes a substance for measuring the expression level of ATG5 gene or LC3B-II gene.

Another aspect of the present invention provides a kit for diagnosing Sjögren's syndrome in dry eye syndrome, which includes the composition as described above.

Still another aspect of the present invention provides a method of providing information for diagnosing Sjögren's syndrome in dry eye syndrome, which includes: measuring the expression level of ATG5 gene or LC3B-II gene in a biological sample; and comparing the expression level of the gene with a normal control thereof.

Still yet another aspect of the present invention provides a method of screening a therapeutic agent for Sjögren's syndrome in dry eye syndrome which includes treating a biological sample obtained from a patient with Sjögren's syndrome with a test substance, analyzing the effect of the test substance on the expression level of ATG5 gene or LC3B-II gene, and selecting the test substance that decreases the expression level of the gene compared to a control

Advantageous Effects

The present inventors have first identified that autodigestion is related to the development of the dry eye, one of the symptoms of Sjögren's syndrome. Thus, the present invention may provide biomarkers for diagnosis of Sjögren's syndrome ATG5 and LC3B-II which were used as autodigestion markers. The present invention may effectively diagnose Sjögren's syndrome in dry eye syndrome except for dry eye syndrome associated with non-Sjögren's syndrome. Further, the present invention may easily diagnose Sjögren's syndrome by using biological samples such as tears and conjunctival epithelial cells which were relatively readily available.

BEST MODE

Figure 1:
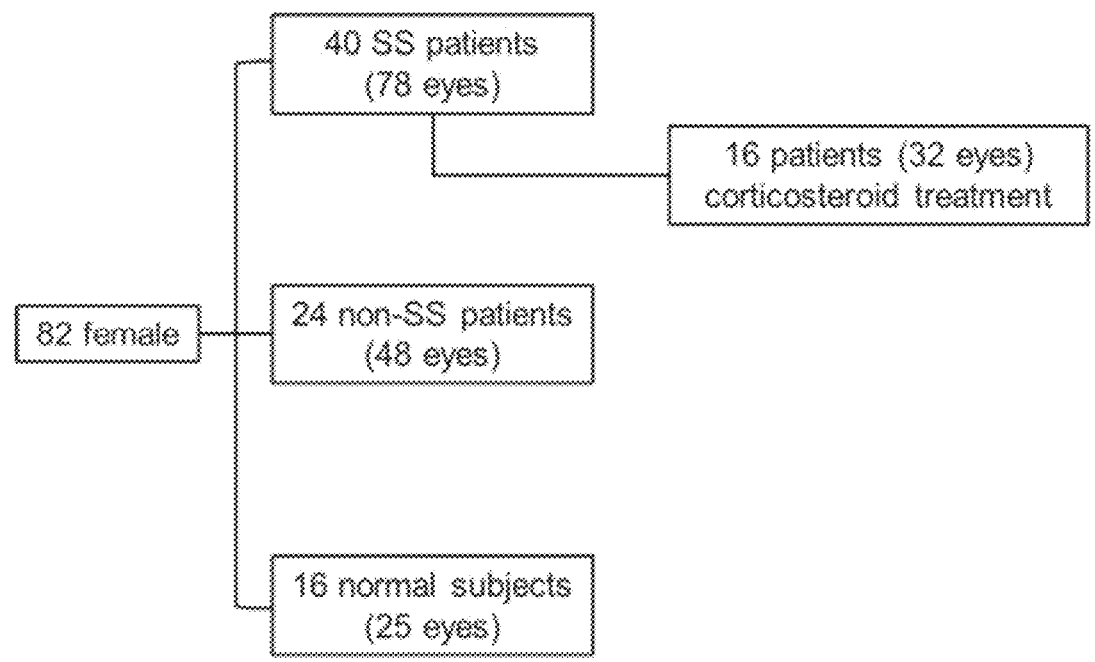
FIG. 1 illustrates the number of subjects according to an embodiment of the present invention.

The present invention is described in detail. However, it should be understood that the present invention may be embodied with various changes and modifications. The embodiments described herein do not limit the present invention.

The present invention provides a composition for diagnosing Sjögren's syndrome in dry eye syndrome, which includes a substance that measures the expression level of ATG5 gene or LC3B-II gene.

As used herein, the term "autophagy-related gene 5 (ATG5)" refers to an autodigestion protein required for the maturation of autophagic membranes, and forms a conjugation with ATG12.

As used herein, the term "LC3B-II" refers to an LC3-phosphatidylethanolamine conjugate in which LC3-I, the cytosol form of the initial LC3, is conjugated to phosphatidylethanolamine through ubiquitin-like enzymatic action to form LC3-II and serves to collect the autophagosome members.

As used herein, the term "autodigestion" refers to the lysosome-mediated catabolism that maintains cell homeostasis through the degradation and reuse of cytoplasmic components and cell organelles.

According to an embodiment of the present invention, the cut-off value for diagnosing Sjögren's syndrome in dry eye syndrome may be 4.002023.

According to an embodiment of the present invention, the ROC curve was analyzed on the autodigestion markers in proteins extracted from the tears of patients with non-Sjögren's syndrome and Sjögren's syndrome. The results indicate that AUC is 0.98, and the cut-off value is 4.002023, demonstrating that ATG5 is very useful as a biomarker for diagnosing Sjögren's syndrome except for non-Sjögren's syndrome, which causes dry eye syndrome.

According to an embodiment of the present invention, the substance for measuring the expression level of the gene may be, without limitation, used as long as it may measure level of mRNA transcribed by the gene or level of protein encoded by the gene. For example, the substance may include antibodies, primers, probes, and the like specific for ATG5 or LC3B-II.

According to an embodiment of the present invention, the measurement of the expression level of the gene may be performed by measuring the level of ATG5 mRNA or LC3B-II mRNA, the level of ATG5 protein or LC3B-II protein, or a conversion ratio of LC3B-II/LC3B-I. The measurement of the expression level of the gene is performed by one method selected from the group consisting of reverse transcription polymerase chain reaction, competitive polymerase chain reaction, real-time polymerase chain reaction, nuclease protection assay (RNase, S1 nuclease assay), in situ hybridization, DNA microarray, northern blotting, western blotting, enzyme linked immune sorbent assay (ELISA), radioimmunoassay, immunodiffusion, immunoelectrophoresis, tissue immunohistochemical staining, immunoprecipitation assay, complement fixation assay, fluorescence-activated cell sorting (FACS), mass spectrometry, and protein microarray.

According to an embodiment of the present invention, the biological sample may include, without limitation, a biological sample that can be collected from patients with Sjögren's syndrome. For example, the biological sample may include tears, a conjunctival epithelial cell, a lacrimal gland, saliva, or a salivary epithelial cell.

As used herein, the term "detection" or "measurement" refers to the quantification of the concentration of a detected or measured subject. Further, as used herein, the term "diagnosis" includes determining the susceptibility of a subject to a specific disease or disorder, determining whether a subject is affected by a specific disease or disorder, determining the prognosis of a subject affected by a specific disease or disorder, or therametrics (e.g., monitoring the state of a subject to provide information on therapeutic efficacy). The diagnosis, for the subject of the present invention, means the diagnosis of Sjögren's syndrome, except for non-Sjögren's syndrome in dry eye syndrome. The expression level of ATG5 gene or LC3B-II gene increases in biological samples. These can be used to diagnose Sjögren's syndrome in dry eye syndrome.

As used herein, the term "gene" refers to any nucleic acid sequence or portion thereof with a functional role in encoding or transcribing a protein or regulating another gene expression. The gene may consist of all the nucleic acids responsible for encoding a functional protein or only a portion of the nucleic acids responsible for encoding or expressing a protein. The nucleic acid sequence may include a genetic abnormality within exons, introns, initiation or termination regions, promoter sequences, other regulatory sequences or unique sequences adjacent to the gene.

As used herein, the term "biomarker" refers to a substance capable of distinguishing cells or tissues of a subject having a disease to be diagnosed from normal cells or tissues. The biomarker includes an organic biomolecule such as a polypeptide, a nucleic acid (e.g., mRNA, etc.), a lipid, a glycolipid, a glycoprotein, and a sugar (monosaccharide, disaccharide, oligosaccharide, etc.), which shows an increase in cells having a disease as compared to that in normal cells.

As used herein, the term "substance for measuring the expression level of ATG5 gene or LC3B-II gene" refers to a substance or molecular capable of detecting the mRNA level or the protein expression level of ATG5 gene or LC3B-II gene or LC3B-II/I conversion ratio by detecting the expression level of ATG5 gene or LC3B-II gene. For example, the substance includes antibodies, primers or probes specific for ATG5 or LC3B-II.

As used herein, the term "primer" refers to a short nucleic acid sequence having a free 3' hydroxyl group, which is able to form a base pair with a complementary template, and functions as a starting point for amplifying the template. The primer may initiate DNA synthesis in the presence of a reagent for polymerization in a suitable buffer solution, at a suitable temperature (that is, DNA polymerase or reverse transcriptase) and four different nucleoside triphosphates. In the present invention, PCR amplification is performed by using sense and antisense primers of ATG5 gene or LC3B-II gene. By identifying production of the desired product or measuring the level thereof, the expression level of ATG5 gene or LC3B-II gene may be determined. The PCR conditions and length of sense and antisense primers can be modified on the basis of the methods known in the art. Thus, the primer is not particularly limited in the present invention.

As used herein, the term "probe" refers to a fragment of nucleic acid such as an RNA or DNA, which is several to hundreds of bases capable of specifically binding to mRNA and is labeled to identify the presence of specific mRNA. The probe can be prepared in the form of the oligonucleotide probe, single-stranded DNA probe, double-stranded DNA probe, RNA probe or the like. In the present invention, hybridization is performed by using a probe complementary to ATG5 gene or LC3B-II gene. The expression level of ATG5 gene or LC3B-II gene may be diagnosed by the hybridization result. Selection of suitable probe and hybridization conditions can be modified on the basis of the methods known in the art. Thus, the probe is not particularly limited in the present invention.

The primer or probe of the present invention may be chemically synthesized by using a phosphoramidite solid support method or another conventional method. The sequence of the nucleic acid may also be modified by using various methods known in the art. Non-limiting examples of such modifications include methylation, capping, substitution with one or more homolog of natural nucleotide, and modification between nucleotides, for example, modification to an uncharged linker (e.g., methyl phosphonate, phosphotriester, phosphoroamidate, and carbamate) or charged linker (e.g., phosphorothioate and phosphorodithioate).

As used herein, the term "antibody" is a term known in the art and refers to a specific protein molecule that indicates an antigenic region. With respect to the subjects of the present invention, the antibody refers to an antibody that specifically binds to the protein expressed in ATG5 gene or LC3B-II gene, a marker of the present invention and can be produced by using methods well-known in the art. This may include the partial peptide that can be produced in the protein. There is no limitation in the form of the antibody of the present invention. A polyclonal antibody, a monoclonal antibody, or a part thereof having antigen-binding property is also included in the present invention. All immunoglobulin antibodies are included in the present invention. Furthermore, the antibody of the present invention also includes special antibodies, such as a humanized antibody.

Further, the present invention provides a kit for diagnosing Sjögren's syndrome in dry eye syndrome, and the kit includes the composition as described above.

As used herein, the term "kit" includes one or more other component compositions, solutions or devices suitable for the analysis method.

Further, the kit may include all the biological or chemical reagents necessary for screening antibody-producing cell lines, essential elements necessary for performing PCR, and a guide brochure. The PCR kit may include, in addition to the primer set, a test tube or other suitable container, a reaction buffer (varying pH and magnesium concentration), an enzyme such as deoxynucleotides (dNTPs), Taq-polymerase and reverse transcriptase, DNase, RNase inhibitor, DEPC-water and sterilized water.

The guide brochure is a print to describe how to use the kit, for example, the reaction conditions presented. The brochure may include a pamphlet or a flyer in the form of the instruction book, a label attached to the kit, and description on the surface of the package including the kit. Further, the brochure may include information that is disclosed or provided through an electronic medium such as the Internet. For purposes of the present invention, when a tear sample is obtained from a patient with dry eye and applied to the kit, the tear sample contacts to the ATG5 or LC3B-II antibody of the kit to detect the binding between the ATG5 or LC3B-II and antibodies, thereby confirming the amount of ATG5 or LC3B-II protein expression of the tear sample. Further, the amount of ATG5 or LC3B-II gene expression can be confirmed by contacting the tear sample with the primer or probe of the kit.

Further, the present invention provides a method of providing information for diagnosing Sjögren's syndrome in dry eye syndrome and includes measuring the expression level of ATG5 gene or LC3B-II gene in a biological sample, and comparing the expression level of the gene with a normal control.

According to an embodiment of the present invention, the measurement of the expression level of the gene may be performed by measuring the level of ATG5 mRNA or LC3B-II mRNA, the level of ATG5 protein or LC3B-II protein, or a conversion ratio of LC3B-II/LC3B-I. The measurement of the expression level of the gene is performed by one method selected from the group consisting of reverse transcription polymerase chain reaction, competitive polymerase chain reaction, real-time polymerase chain reaction, nuclease protection assay (RNase, S1 nuclease assay), in situ hybridization, DNA microarray, northern blotting, western blotting, enzyme linked immune sorbent assay (ELISA), radioimmunoassay, immunodiffusion, immunoelectrophoresis, tissue immunohistochemical staining, immunoprecipitation assay, complement fixation assay, fluorescence-activated cell sorting (FACS), mass spectrometry, and protein microarray.

According to an embodiment of the present invention, the biological sample may include, without limitation, a biological sample that can be collected from patients with Sjögren's syndrome. For example, the biological sample may include tears, a conjunctival epithelial cell, a lacrimal gland, saliva, or a salivary epithelial cell.

Further, the present invention provides a method of screening a therapeutic agent for Sjögren's syndrome in dry eye syndrome and includes treating a biological sample obtained from a patient with Sjögren's syndrome with a test substance, analyzing the effect of the test substance on the expression level of ATG5 gene or LC3B-II gene, and selecting the test substance that decreases the expression level of the gene compared to a control.

Further, the present invention provides a method of measuring the expression level of ATG5 or LC3B-II in a patient with dry eye and includes collecting tears from the patient with dry eye, and measuring the expression level of ATG5 or LC3B-II protein by contacting the tears with anti-ATG5 or anti-LC3B-II antibody and measuring binding affinity between the protein and the antibody, or measuring the expression level of ATG5 or LC3B-II gene by using a primer or a probe that selectively binds to ATG5 or LC3B-II mRNA isolated from tears.

EXAMPLES

Hereinafter, the present invention will be described in more detail with reference to Examples. It will be apparent to those skilled in the art that the following Examples are merely illustrative of the present invention and that the scope of the present invention is not limited by these Examples.

The prospective cross-sectional control-regulation study of the Example was conducted in the ophthalmology department of Seoul St. Mary's Hospital of the Catholic University of Korea. This study protocol was determined in accordance with the guidelines of the Helsinki Declaration and was approved by the Bioethics Committee of the Seoul St. Mary's Hospital. Samples were obtained with all subjects' consent.

All described data are expressed as mean and SD. SPSS software (version 15.0, SPSS Inc, Chicago, IL) and GraphPadPrism (version 5.0, GraphPadInc. LaJolla, CA) were used to analyze data. The Shapiro-Wilk test was used to evaluate the steady state of data. One-way analysis of variance (ANOVA) and T-test were used to compare groups. The Pearson correlation coefficient between the autodigestion marker and the clinical parameters was calculated so as to evaluate the relationship between the expression level of the autodigestion marker and the clinical variables. Two-sided p values<0.05 was considered statistically significant.

Example 1

Clinical Evaluation.
1.1. Subject Selection.

82 female subjects participated in this Example (FIG. 1): 40 patients with Sjögren's syndrome dry eye (SS DE) (78 eyes), 24 patients with non-Sjögren's syndrome dry eye (non-SS DE) (48 eyes), and 16 normal healthy subjects as controls (25 eyes). 16 patients of the 40 patients with Sjögren's syndrome dry eye were treated with topical corticosteroid (4 times per one day for 1 month, 0.1% fluorometholone, Sam-Il Pharmaceutics Co. Seoul, Korea). All patients with dry eye syndrome had a severity of at least Grade 2 according to criteria classified by the International Dry Eye WorkShop (DEWS) severity grading scheme. All patients with Sjögren's syndrome dry eye were diagnosed with primary Sjögren's syndrome by a rheumatologist according to the 2012 Sjögren's International Collaborative Clinical Alliance (SICCA) classification criteria. This study excluded Sjögren's syndrome patients or subjects who had been treated with disease-modifying therapies. Due to the unique prevalence of females and males found in Sjögren's syndrome (F:M=9:1), only female patients participated in the study for the prevention of the data misinterpretation. Exclusion criteria were pregnant women, nurses, contact lens wearers, tear point closure patients, persons with eye surgery within 6 months, persons with acute or chronic eye disease other than dry eye syndrome, persons with concomitant allergies, persons with eyelid abnormalities, persons with Grade 2 or higher dysfunction of the meibomian gland. This study also excluded, as a subject, persons who had received other systemic treatments or other topical treatments other than artificial tears within the past 3 months.

1.2. Clinical Evaluation

The following ocular surface examinations were conducted on the 82 subjects; Schirmer I test, tear film breakup time (TBUT), ocular surface staining (OSS) score, and ocular surface disease index (OSDI) questionnaire.

The Schirmer I test was performed without anesthesia before injecting the drug into the eye. The standard Schirmer's strips were placed on the side ⅓ of the lower eyelid. After 5 minutes, the strips' wetness was measured by using a millimeter scale of the strips (Eagle Vision, Memphis, TN). Tear strips were cut horizontally and placed in cryovials. They were stored frozen for further analysis. To assess TBUT, one drop of the saline without preservatives was added to a fluorescein strip (Haag-Streit, Koeniz, Switzerland). It was applied to the conjunctiva of the lower eyelid. The patients blinked their eye 3 to 4 times for a few seconds for mixing thoroughly with the dye. Then, the test was conducted by using a slit lamp with cobalt blue light. The time until the defect appeared in the stained tear film was measured and recorded as TBUT. TBUT was measured three times and the score was averaged. OSS scores including conjunctival and corneal staining scores were evaluated according to the SICCA registry ocular examination protocol. First, one drop of 2% sterile fluorescein was put on the conjunctival sac to permeate. After one minute, the corneal staining score was assessed by evaluating fluorescein staining using a slit lamp with cobalt blue filter. The punctate epithelial erosions (PEE) stained with fluorescein were calculated and scored. When there is no PEE, the score is zero. When PEE is 1 to 5, the corneal score is 1; When PEE is 6 to 30, the score is 2; When PEE exceeds 30, the score is 3. Additional points were added when there were one or more fused staining portions, when there was staining in the pupil area of the cornea, or when there were one or more filaments in any part of the cornea. The maximum available score is 6 for each cornea. In order to measure the conjunctival staining score, fluorescein was washed with the saline without preservatives. Then, one drop of 1% Lissamine green dye (Leiter's Pharmacy San Jose, California) was applied to the lower conjunctival fornix of both eyes. After several blinks, conjunctival staining scores were assessed on the nasal or temporal bulbar conjunctiva, respectively; Score 0 is defined as 0 to 9 Lissamine green staining points; Score 1 is defined as 10 to 32 points; Score 2 is defined as 33 to 100 points; Score 3 is defined as 100 or more points. The maximum possible score is 6 for the conjunctiva (sum of the nasal and temporal bulbar conjunctiva). The total OSS score for each eye is the sum of the fluorescein score for the cornea and the Lissamine green score for the nasal and temporal bulbar conjunctiva. Therefore, the maximum possible score is 12 for each eye.

The results of clinical evaluation of 82 subjects are shown in Table 1. The patients with Sjögren's syndrome dry eye showed significantly lower Schirmer I level and TBUT and significantly higher conjunctival staining score and OSS compared with the patients with non-Sjögren's syndrome dry eye. There was no significant difference in age, OSDI, and corneal staining score among patients with Sjögren's syndrome dry eye and non-Sjögren's syndrome dry eye (P=0.3602, 0.0938, and 0.0579, respectively).

TABLE 1

| Characteristics | SS DE | non-SS DE | Normal control | P value |
|---|---|---|---|---|
| No. of patients (eyes) | 40 (78) | 24 (48) | 16 (25) | |
| Age (y) | 53.80 ± 11.77 (28 to 78) | 50.13 ± 14.80 (18 to 80) | 53.43 ± 16.76 (25 to 78) | 0.3602 |
| OSDI (0-100) | 47.57 ± 26.19 (2 to 100) | 37.59 ± 17.94 (3.5 to 70.45) | 6.77 ± 13.95 (0 to 42.5) | 0.0938 |
| Schirmer I value (mm) | 2.72 ± 1.88 (0 to 8) | 5.81 ± 2.21 (2 to 10) | 11.46 ± 3.66 (2 to 15) | <0.0001 |
| TBUT (s) | 2.82 ± 2.30 (0 to 10) | 4.63 ± 2.38 (2 to 10) | 7.58 ± 1.90 (4 to 10) | <0.0001 |
| Corneal staining score (0-6) | 2.22 ± 1.47 (0 to 6) | 1.73 ± 1.01 (0 to 4) | 0 | 0.0579 |
| Conjunctival staining score (0-6) | 2.12 ± 1.34 (0 to 5) | 0.77 ± 0.95 (0 to 3) | 0 | <0.0001 |
| Ocular staining score (0-12) | 4.33 ± 2.45 (0 to 11) | 2.50 ± 1.65 (0 to 7) | 0 | <0.0001 |

OSDI = ocular surface disease index;
TBUT = tear film break-up time;
OSS = ocular surface stain
* comparison between SS DE and non-SS DE Example 2

Autodigestion Marker Expression in Tear and Conjunctival Epithelial Cells.

2.1. Tear Collection and Western Blotting Analysis.

Tears were collected from the Schirmer strips which absorbed the tear fluid as in Example 1. In order to extract tears, the Schirmer strips were placed in tubes containing extraction buffer (NaCl 0.5 M, Tween 20 0.5% in PBS). After one hour, the strips were transferred to a 0.5 ml tube with a hole at the bottom thereof using a cannula. The tube was inserted into a larger tube (1.5 ml). It was centrifuged at 12,000 rpm for 15 minutes. The centrifugal force caused the fluid to be drawn from the strip. Thus, the tear fluid passed through the center hole at the bottom of the small tube and was collected into the external 1.5 ml tube. The tear fluid was mixed with the sample-loading buffer, heated for 10 minutes, and centrifuged. Then, the protein concentration in the clear isolate was determined by using the BCA protein assay kit (Thermo Fisher Scientific, Rockford, IL). Equal amounts of the protein were isolated by 15% SDS-PAGE under a condition of reduction and were electrotransferred to PVDF membranes (Millipore, Billerica, Massachusetts). The PVDF membranes were blocked with 5% skim milk in PBS containing 0.1% Tween 20. They were incubated with primary rabbit polyclonal Ab targets LC3B-I and II (Cell Signaling Technology, Boston, Massachusetts) or ATG5 (Novus Biologicals, Littleton, Colorado) at 4° C. for 18 hours. After three washes, the membranes were incubated with anti-rabbit horseradish peroxidase-conjugated secondary Ab (Thermo Fisher Scientific) for 1 hour at room temperature. Finally, the membranes were washed three times. The improved chemical luminescence reagent (ECL; Amersham Biosciences, Sweden) was used to detect the protein band. All membranes were degraded and re-probed with mouse monoclonal anti-β-actin Ab (Santa Cruz Biotechnology, Dallas, Texas) so as to provide a standardization reference. In each experiment, the colorant for β-actin was used to normalize the relative expression level by image analysis. The experiments were carried out 4 to 6 times.

2.2. Impression Cytology (IC).

IC was carried out 15 minutes after the last stained eye solution was permeated by using a polyethersulfone filter (Suopor 200 membrane, Pall Corporation, Port Washington, New York). The filter paper was cut in half (13×6.5 mm). The sides were attached on the upper side-nasal and the upper side-temporal bulbar conjunctiva, respectively. With 0.05% paraformaldehyde (PFA), the filter attached on the upper side-nasal conjunctiva was transferred into a tube containing 2 ml of PBS for immunostaining. The paper attached on the upper side-temporal conjunctiva was collected from the filter paper up to 3 hours for the RNA extraction.

2.3. Immunofluorescent Staining.

The IC filter paper having isolated epithelial cells was firmly pressed against a silane-coated slide (Muto Pure Chemicals Co., ltd. Tokyo, Japan). Thus, the epithelial cells were transferred onto the slide. They were used for immunofluorescence staining according to the Baudouins protocol. The cells were fixed with cold methanol, permeabilized with 0.1% Triton X-100, and incubated with 10% goat serum for 1 hour, thereby blocking non-specific reactions. Then, the cells were incubated with anti-LC3B-I, II or ATG5 antibodies. After two washes with PBS, they were incubated with Alexa Flour 488 conjugated anti-rabbit IgG Ab. A confocal microscope (LSM 510 Meta, Carl Zeiss Meditec Inc. Dublin, California) captured the coloration, and the captured products were transferred to Photoshop (Adobe systems, Santa Clara, California).

2.4. RNA Isolation and Real-Time PCR.

RNAs were isolated from IC using TRIzol reagent (Gibco-Invitrogen, Grand Island, New York) according to the modified protocol (Barabino S et al., Immune response in the conjunctival epithelium of patients with dry eye. Experimental eye research 2010; 91: 524-9). The first strand of complementary DNA (cDNA) was synthesized in a random hexamer using SuperScript III™ reverse transcriptase (Invitrogen). The SYBR Green I real-time PCR method was used. In order to calibrate the integrity of the reaction and the total amount of RNAs, an average Ct (threshold cycle) value for GAPDH was used for internal measurements. The $2^{\Delta\Delta Ct}$ method was used for relative quantification. The primers used in this Example were shown as follows: LC3B-II Forward, 5-CTT TGG GTG CGA CTT GAC G-3 (SEQ ID No. 1); LC3B-II Reverse, 5-GTC GAC CCC GCT CCT TTT-3 (SEQ ID No. 2); ATG5 Forward, 5-AGG AGA GCC TGT ACC TAT GGA-3 (SEQ ID No. 3); and ATG5 Reverse, 5-TTC TCT GTT GCG CTT TTC TGA-3 (SEQ ID No. 4).

Figure 2A:
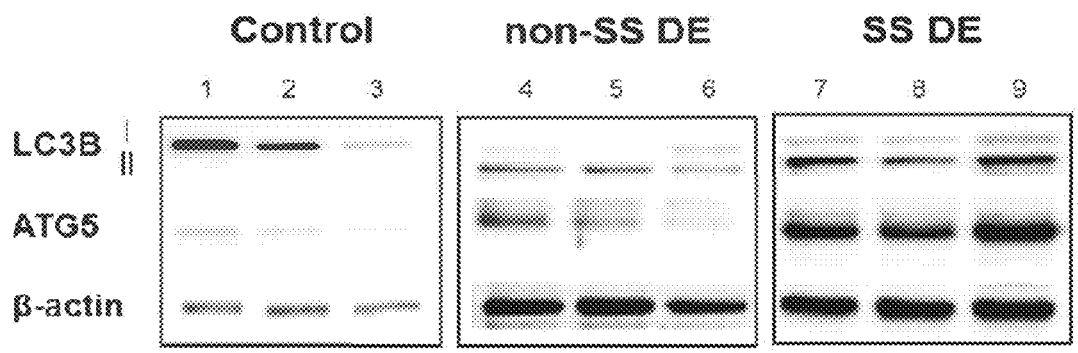
FIGS. 2A-2B illustrate (a) results of western blotting and (b) results of relative concentration measurement illustrating ATG5 protein expression and LC3B-II/I conversion ratio in tears according to an embodiment of the present invention.
Figure 2B:
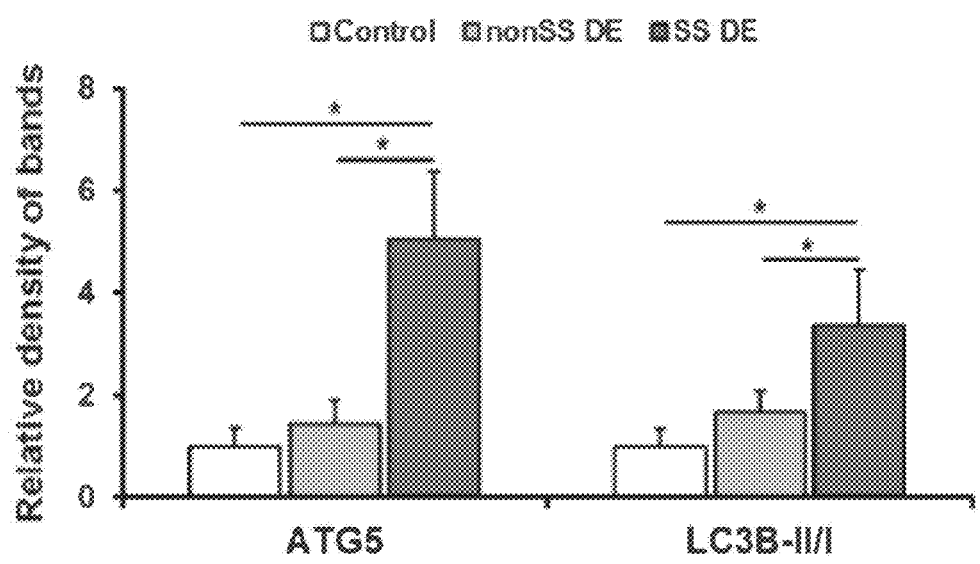

Western blotting analysis of tears showed a statistically significant increase in the ATG5 protein and LC3BII/I conversion ratio in Sjögren's syndrome dry eye compared with non-Sjögren's syndrome dry eye and the control groups. The results of the relative concentration measurements demonstrated that the ATG5 protein (vs β-actin) and LC3B-II/I protein ratio in tears for Sjögren's syndrome dry eye (5.06±1.31 and 3.37±1.08) were significantly higher than those for non-Sjögren's syndrome dry eye (1.44±0.46 and 1.67±0.40) and control groups (1.00±0.35 and 1.00±0.35) (P<0.05) (See FIG. 2).

Figure 3:
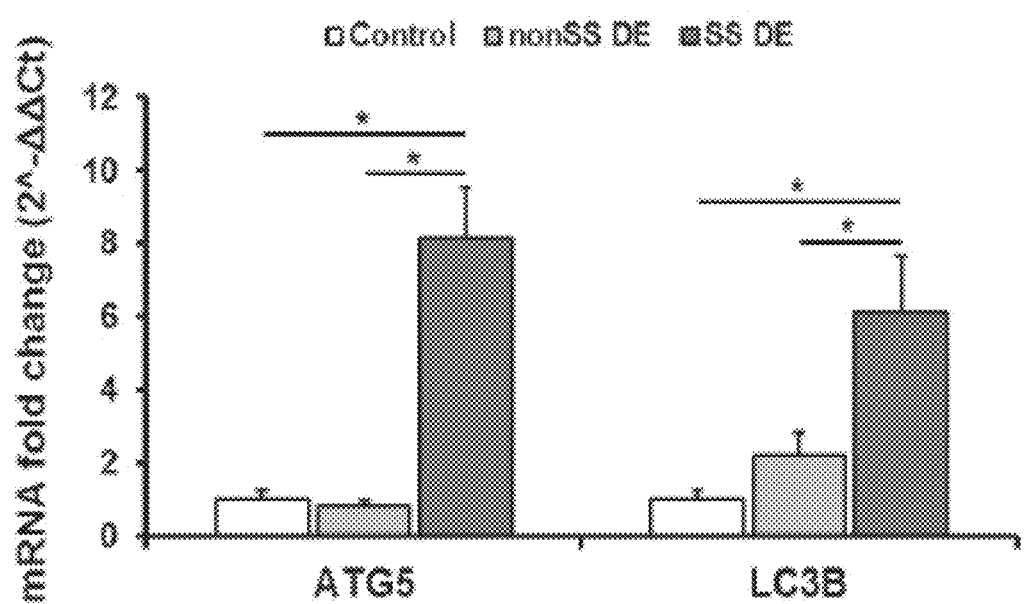
FIG. 3 is a graph illustrating expression levels of ATG5 and LC3B-II mRNA in conjunctival epithelial cells according to an embodiment of the present invention.
Figure 4:
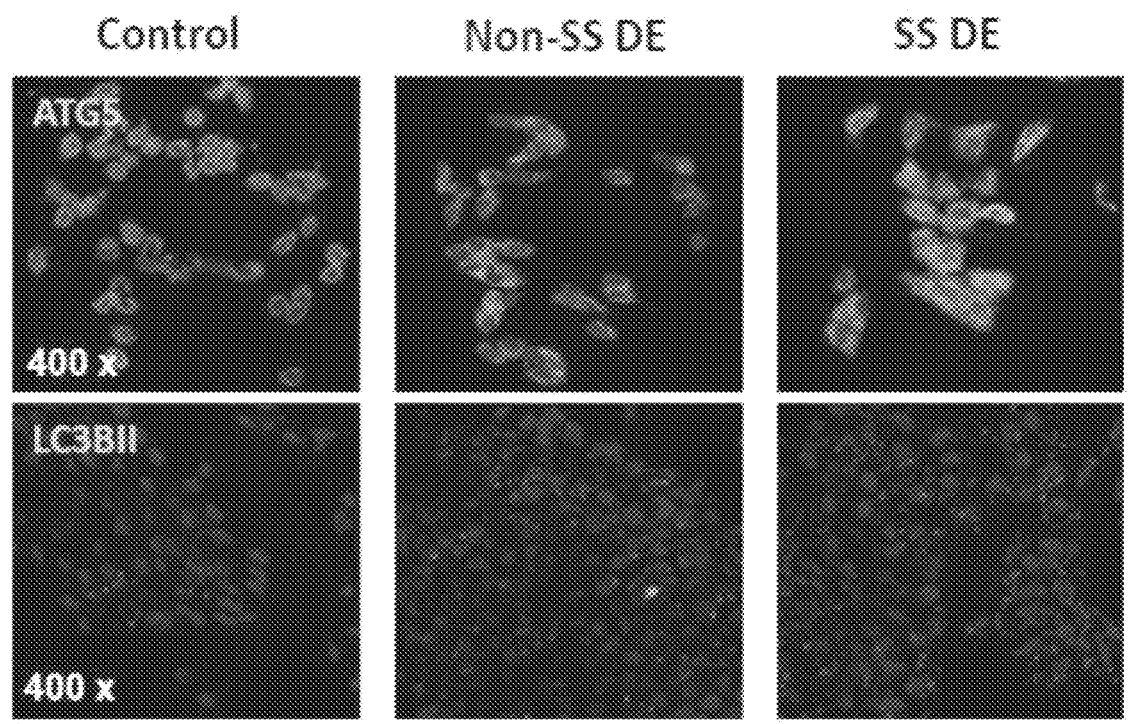
FIG. 4 is a confocal image of illustrating results of immunostaining ATG5 and LC3B-II in conjunctiva according to an embodiment of the present invention.

The conjunctival IC samples showed that the levels of mRNA encoding ATG5 and LC3B-II in the conjunctiva for the Sjögren's syndrome dry eye (8.15±1.38 and 6.14±1.51 times in changes) were higher compared with those for non-Sjögren's syndrome dry eye (0.80±0.17 and 2.21±0.61 times in changes) and control groups (1.00±0.25 and 1.00±0.24 times in changes) (See FIG. 3, all P<0.05). There was no significant difference in the autodigestion markers expression confirmed from tear and conjunctival IC samples between non-Sjögren's syndrome dry eye and control groups. In the immunofluorescent staining of conjunctival IC samples, the cytoplasmic staining spotting pattern of ATG5, which exhibits autodigestion was observed in Sjögren's syndrome dry eye, whereas ATG5 was diffusely stained in non-Sjögren's syndrome dry eye and control groups (See FIG. 4). Further, the spotting staining focal of LC3B-II protein staining was significantly increased in Sjögren's syndrome dry eye compared with non-Sjögren's syndrome dry eye and control groups (See FIG. 4). In conclusion, autodigestion marker expression is upregulated in the tears and conjunctiva of Sjögren's syndrome dry eye patients, demonstrating that the autodigestion is associated with the onset of Sjögren's syndrome dry eye.

Example 3

Autodigestion Marker Expression in Lacrimal Gland of Animal Model.

Because the human lacrimal gland biopsy was a relatively invasive process, the lacrimal glands of Sjögren's syndrome animal models were studied. Expression of ATG5 and LC3B-II proteins in the lacrimal gland was evaluated by immunohistochemical staining of NOD/LtJ mice and IκB-ζ KO mice, which are known to exhibit similar characteristics of Sjögren's syndrome dry eye. The paraffin sections of the lacrimal glands of NOD/LtJ mice and IκB-ζ KO mice were received by Professor Joe Mira of Catholic University of Korea (Seoul, Korea) and Professor Kwon Mina of Asan Seoul Hospital of Ulsan University (Seoul, Korea). NOD/LtJ mice were purchased from Charles River Laboratory (Wilmington, Massachusetts) and IκB-ζ KO mice were provided by Professor Shizuo Akira of Osaka University (Osaka, Japan). The lacrimal glands were removed from 8-week and 16-week old NOD/LtJ mice and 5-week old IκB-ζ mice (−/−, +/−). All procedures in animal experiments were conducted according to the criteria of Association for Research in Vision and Ophthalmology Statement for Use of Animals of Ophthalmic and Vision Research. Protein amount and mRNA expression of ATG5 and LC3B-II in the lacrimal gland of animal models were carried out by western blotting analysis and real-time PCR as described in Examples 2 and 3.

Figure 5A:
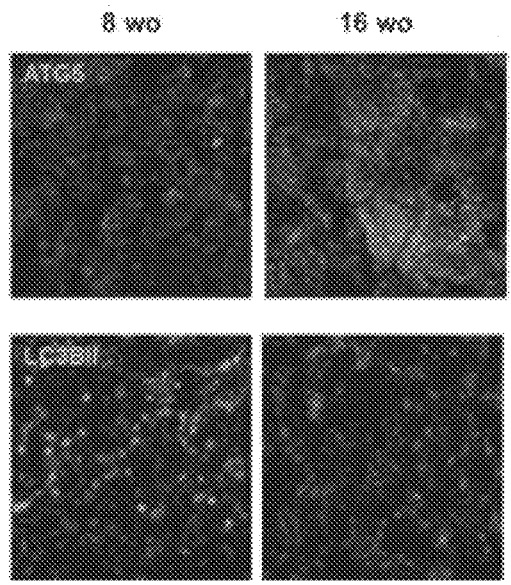
FIGS. 5A-5B are images illustrating the results of immunofluorescence staining of ATG5 and LC3B-II in the lacrimal gland of Sjögren's syndrome animal model (a) NOD/LtJ and (b) IκB-ζ deficient mice according to an embodiment of the present invention.
Figure 5B:
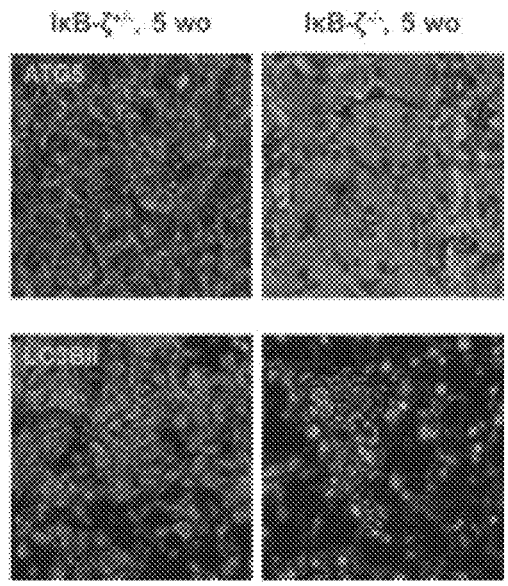

In the lacrimal gland of NOD/LtJ mice, the cytoplasmic staining spotting pattern of ATG5 and LC3B-II proteins was observed at 8 weeks old and developed predominantly during gestation at 16 weeks old (See FIG. 5A). Further, 5 weeks old IκB-ζ KO mice showed separate spots of ATG5 with increased background intensity and showed prominent spots of LC3B-II throughout acinar cells compared to control mice (IκB-ζ+/−) (See FIG. 5B). These findings hypothesize that the autodigestion may be induced in the lacrimal gland of Sjögren's syndrome dry eye patients.

Example 4

Correlation Between Autodigestion Marker and Clinical Parameter in Sjögren's Syndrome Dry Eye.

The autodigestion markers were significantly upregulated in Sjögren's syndrome rather than non-Sjögren's syndrome in dry eye syndrome. Thus, the correlation was investigated between autodigestion markers and clinical parameters in Sjögren's syndrome dry eye (See Table 2). The LC3B-II/I protein ratio showed autodigestion markers. All two markers increased in the Sjögren's syndrome dry eye. Thus, the correlation was investigated between the clinical parameters and LC3B-II and ATG5 gene encoding level in the conjunctival epithelium and ATG5 protein expression and LC3B-II/I protein ratio of the tears in Sjögren's syndrome dry eye. The ATG5 expression is strongly associated with corneal staining, conjunctival staining, and OSS score in Sjögren's syndrome, showing that it can be used as a biomarker in Sjögren's syndrome.

TABLE 2

|  | ρ | 95% confidence interval | P value |
|---|---|---|---|
| ATG5 (tear) | | | |
| vs. OSDI | 0.1003 | −0.2313 to 0.4110 | 0.5547 |
| vs. Schirmer | −0.2781 | −0.5596 to 0.0608 | 0.1057 |
| vs. TBUT | 0.0541 | −0.2704 to 0.3675 | 0.7471 |
| vs. corneal stain | 0.4810 | 0.1951 to 0.6916 | 0.0019* |
| vs. conjunctival stain | 0.5917 | 0.3354 to 0.7664 | <0.0001* |
| vs. OSS | 0.5956 | 0.3449 to 0.7670 | <0.0001* |
| LC3B II/I (tear) | | | |
| vs. OSDI | 0.2620 | −0.0836 to 0.5514 | 0.1344 |
| vs. Schirmer | −0.1134 | −0.4446 to 0.2451 | 0.5367 |
| vs. TBUT | −0.1023 | −0.4212 to 0.2392 | 0.5588 |
| vs. corneal stain | 0.1193 | −0.2179 to 0.4310 | 0.4884 |
| vs. conjunctival stain | 0.0546 | −0.2839 to 0.3809 | 0.7556 |
| vs. OSS | 0.1008 | −0.2356 to 0.4156 | 0.5586 |
| ATG5 (IC) | | | |
| vs. OSDI | −0.4450 | −0.7355 to −0.0164 | 0.0432* |
| vs. Schirmer | 0.2439 | −0.1982 to 0.6035 | 0.2741 |
| vs. TBUT | 0.0827 | −0.3512 to 0.4875 | 0.7142 |
| vs. corneal stain | 0.7371 | 0.4576 to 0.8840 | <0.0001* |
| vs. conjunctival stain | 0.4604 | 0.04801 to 0.7387 | 0.0311* |
| vs. OSS | 0.7026 | 0.3991 to 0.8673 | 0.0003* |
| LC3BII (IC) | | | |
| vs. OSDI | 0.2383 | −0.1930 to 0.5924 | 0.2736 |
| vs. Schirmer | 0.1051 | −0.3312 to 0.5045 | 0.6414 |
| vs. TBUT | −0.2784 | −0.6196 to 0.1512 | 0.1983 |
| vs. corneal stain | −0.1049 | −0.4958 to 0.3213 | 0.6338 |
| vs. conjunctival stain | −0.2367 | −0.5913 to 0.1946 | 0.2769 |
| vs. OSS | −0.2076 | −0.5710 to 0.2239 | 0.3419 |

OSDI = ocular surface disease index;
TBUT = tear film break-up time;
OSS = ocular surface stain Example 5

Effect of Topical Corticosteroid Treatment at the Level of Clinical Parameters and Autodigestion Marker in Sjögren's Syndrome Dry Eye.

After applying topical corticosteroids to Sjögren's syndrome dry eye patients, change in the clinical parameters was assessed as well as autodigestion marker expression. After one month with topical corticosteroid therapy with artificial tears, OSDI score, Schirmer I value, TBUT, corneal staining, conjunctival staining, and OSS score were measured as in Example 1. Further, western blotting and real-time PCR were carried out as in Examples 2 and 3.

The clinical parameters were increased by decreasing OSDI score, increasing Schirmer I value, increasing TBUT, decreasing corneal staining score, decreasing conjunctival staining score, and decreasing OSS score after the treatment with a corticosteroid in Sjögren's syndrome-caused dye eye (See Table 3).

TABLE 3

|  | Before treatment | After treatment | P value |
| --- | --- | --- | --- |
| OSDI score (0-100) | 50.19 ± 19.17 (15 to 80.5) | 39.80 ± 17.89 (22.5 to 80) | 0.0411 |
| Schirmer value (mm) | 2.34 ± 1.66 (0 to 6) | 3.78 ± 2.41 (2 to 12) | 0.0088 |
| TBUT (s) | 2.16 ± 2.22 (0 to 8) | 3.84 ± 1.90 (2 to 8) | 0.0007 |
| Corneal staining score (0-6) | 2.78 ± 1.10 (0 to 6) | 1.59 ± 1.21 (0 to 4) | <0.0001 |
| Conjunctival staining score (0-6) | 2.13 ± 1.90 (0 to 5) | 1.06 ± 1.70 (0 to 6) | 0.0018 |
| Ocular surface staining score (0-12) | 4.84 ± 3.08 (0 to 10) | 2.53 ± 2.55 (0 to 10) | <0.0001 |

OSDI = ocular surface disease index;
TBUT = tear film break-up time

Figure 6A:
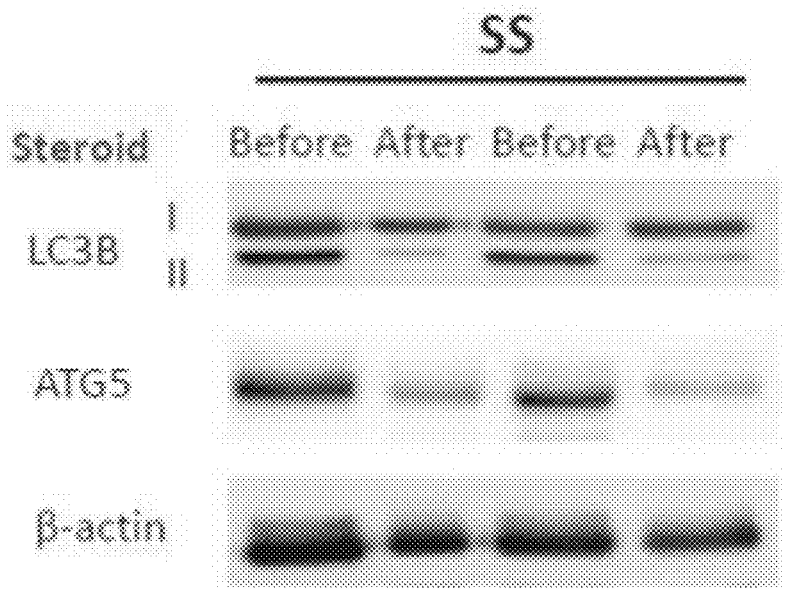
FIGS. 6A-6B illustrate (a) results of western blotting and (b) results of relative concentration measurement illustrating ATG5 and LC3B-II protein expression of tears before and after the corticosteroid-treatment according to an embodiment of the present invention.
Figure 6B:
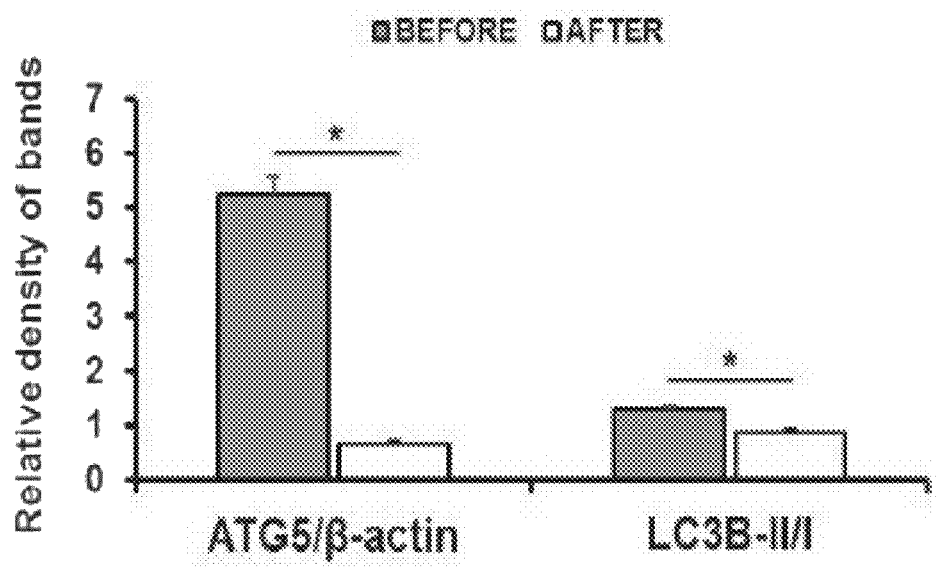
Figure 7:
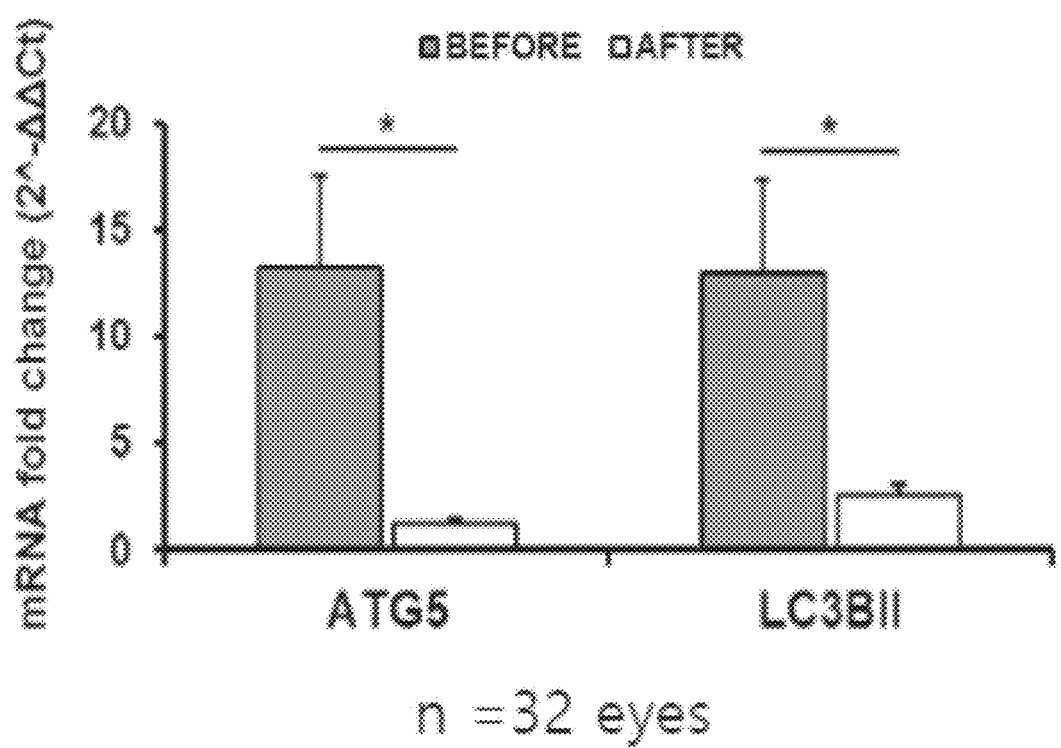
FIG. 7 is a graph illustrating ATG5 and LC3B-II mRNA expression levels in conjunctival epithelial cells before and after the corticosteroid-treatment according to an embodiment of the present invention.
Figure 8:
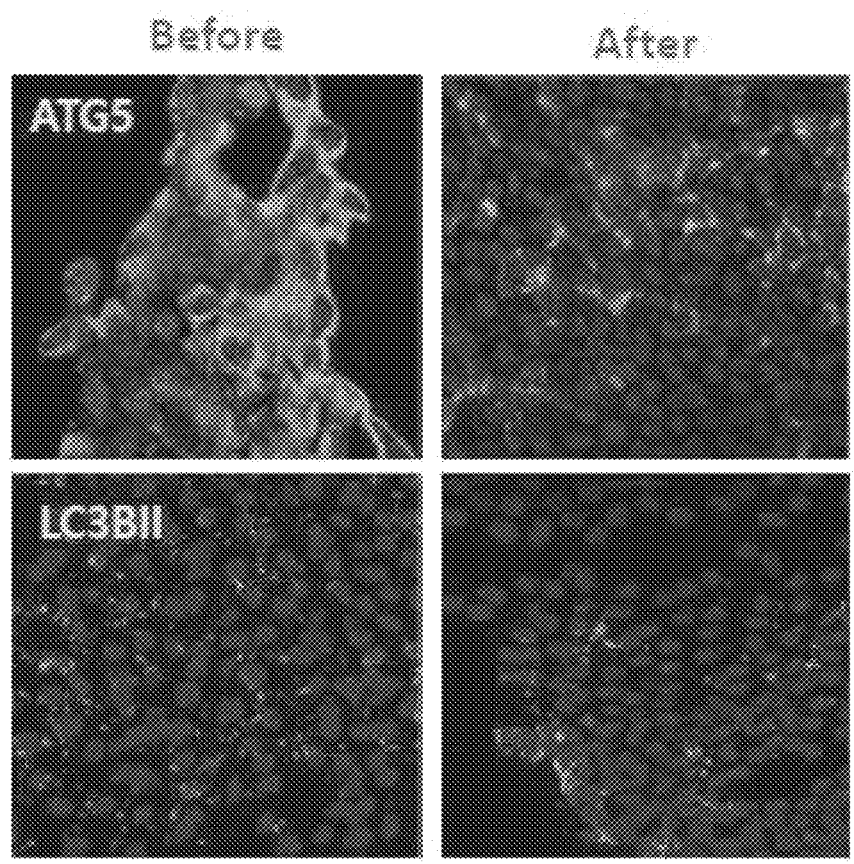
FIG. 8 is an image illustrating results of immunostaining ATG5 and LC3B-II of conjunctiva before and after the corticosteroid-treatment according to an embodiment of the present invention.

According to the clinical improvement, representative western blotting images demonstrate a decrease in LC3B-II/I protein conversion and ATG5 protein expression after the corticosteroid treatment (See FIG. 6). The results of measuring the relative concentration showed that ATG5 protein (vs β-actin) and LC3B-II/I protein ratio in tears were statistically significantly decreased in approximately 0.88±0.07 and 1.27±0.08 times in change, respectively, compared to levels before the corticosteroid treatment (5.06±0.31 and 1.87±0.10) (See FIG. 6). ATG5 and LC3B-II gene encoding levels were statistically significantly decreased in approximately 1.23±0.27 and 2.57±0.48 times in change, respectively, compared to levels before the corticosteroid treatment (13.16±4.36 and 12.93±4.44 times in changes) (See FIG. 7). Further, representative immunohistochemical images showed that the staining spotting pattern of the autodigestion marker in the conjunctiva was also normalized in Sjögren's syndrome dry eye after the corticosteroid treatment (See FIG. 8).

Example 6

ROC Curve Analysis and Cut-Off Value Calculation of Autodigestion Marker in Protein Extracted from Tears of Non-Sjögren's Syndrome Dry Eye and Sjögren's Syndrome Dry Eye.

Figure 9:
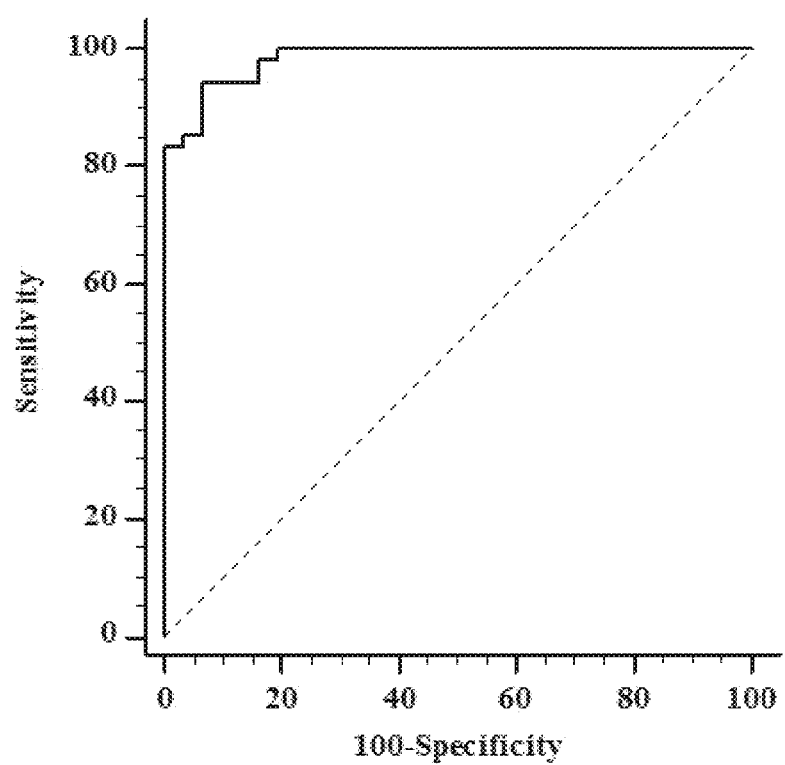
FIG. 9 is a graph illustrating results of ROC curve analysis for ATG5 according to an embodiment of the present invention.

ROC curve analysis and cut-off values of proteins extracted from the tears of patients with non-Sjögren's syndrome dry eye and from the tears of patients with Sjögren's syndrome dry eye were derived so as to verify whether the ATG5 marker can be used as a diagnostic biomarker for effectively diagnosing Sjögren's syndrome except for non-Sjögren's syndrome. Specifically, 31 patients with non-Sjögren's syndrome dry eye were assigned 0 as control, and 55 patients with Sjögren's syndrome were assigned 1. Then, the response rate of each ATG5 protein was determined. Thereafter, the ROC curve was obtained as the cut-off value was adjusted while obtaining a 95% confidence interval (CI) value of sensitivity and specificity. By the curve, the area of the lower portion of the ROC curve, that is, the AUC (area under curve) was obtained. As shown in Tables 4 and 5 and FIG. 9, when the cut-off value was 4.002, it was confirmed that the sensitivity was 94.6 and the specificity was 93.6. Further, the AUC was 0.98, which was within a range of 0.90 to 1.00, so that it was very useful. Thus, it was confirmed that ATG5, an autodigestion marker, is a useful biomarker for the diagnosis of Sjögren's syndrome except for non-Sjögren's syndrome, which is a cause of dry eye syndrome.

TABLE 4

|  | Sensitivity | Specificity |
| --- | --- | --- |
| ≥0.3014 | 100.0 (93.5-100.0) | 0.0 (0.0-11.2) |
| >0.3014 | 100.0 (93.5-100.0) | 3.2 (0.08-16.7) |
| >0.6552 | 100.0 (93.5-100.0) | 6.5 (0.8-21.4) |
| >0.7912 | 100.0 (93.5-100.0) | 9.7 (2.0-25.8) |
| >0.8117 | 100.0 (93.5-100.0) | 12.9 (3.6-29.8) |
| >1.0212 | 100.0 (93.5-100.0) | 16.1 (5.5-33.7) |
| >1.2195 | 100.0 (93.5-100.0) | 19.4 (7.5-37.5) |
| >1.404 | 100.0 (93.5-100.0) | 22.6 (9.6-41.1) |
| >1.5442 | 100.0 (93.5-100.0) | 25.8 (11.9-44.6) |
| >1.6213 | 100.0 (93.5-100.0) | 29.0 (14.2-48.0) |
| >1.662 | 100.0 (93.5-100.0) | 32.3 (16.7-51.4) |
| >1.8111 | 100.0 (93.5-100.0) | 35.5 (19.2-54.6) |
| >2.0261 | 100.0 (93.5-100.0) | 38.7 (21.8-57.8) |
| >2.0955 | 100.0 (93.5-100.0) | 41.9 (24.5-60.9) |
| >2.2473 | 100.0 (93.5-100.0) | 45.2 (27.3-64.0) |
| >2.45 | 100.0 (93.5-100.0) | 48.4 (30.2-66.9) |
| >2.5826 | 100.0 (93.5-100.0) | 51.6 (33.1-69.8) |
| >2.7155 | 100.0 (93.5-100.0) | 54.8 (36.0-72.7) |
| >2.7766 | 100.0 (93.5-100.0) | 58.1 (39.1-75.5) |
| >2.8462 | 100.0 (93.5-100.0) | 61.3 (42.2-78.2) |
| >2.8918 | 100.0 (93.5-100.0) | 64.5 (45.4-80.8) |
| >2.9394 | 100.0 (93.5-100.0) | 67.7 (48.6-83.3) |
| >2.9437 | 100.0 (93.5-100.0) | 71.0 (52.0-85.8) |
| >3.0726 | 100.0 (93.5-100.0) | 74.2 (55.4-88.1) |
| >3.1284 | 100.0 (93.5-100.0) | 77.4 (58.9-90.4) |
| >3.3796 | 100.0 (93.5-100.0) | 80.7 (62.5-92.5) |
| >3.4718 | 98.2 (90.3-100.0) | 80.7 (62.5-92.5) |
| >3.5823 | 98.2 (90.3-100.0) | 83.9 (66.3-94.5) |
| >3.6506 | 96.4 (87.5-99.6) | 83.9 (66.3-94.5) |
| >3.7019 | 94.6 (84.9-98.9) | 83.9 (66.3-94.5) |
| >3.8284 | 94.6 (84.9-98.9) | 87.1 (70.2-96.4) |
| >3.9155 | 94.6 (84.9-98.9) | 90.3 (74.2-98.0) |
| >4.002 | 94.6 (84.9-98.9) | 93.6 (78.6-99.2) |
| >4.0815 | 92.7 (82.4-98.0) | 93.6 (78.6-99.2) |
| >4.4506 | 90.9 (80.0-97.0) | 93.6 (78.6-99.2) |
| >4.5083 | 89.1 (77.8-95.9) | 93.6 (78.6-99.2) |
| >4.5517 | 87.3 (75.5-94.7) | 93.6 (78.6-99.2) |
| >5.0517 | 85.5 (73.3-93.5) | 93.6 (78.6-99.2) |
| >5.1423 | 85.5 (73.3-93.5) | 96.8 (83.3-99.9) |
| >5.1562 | 83.6 (71.2-92.2) | 96.8 (83.3-99.9) |
| >5.327 | 83.6 (71.2-92.2) | 100.0 (88.8-100.0) |
| >5.456 | 81.8 (69.1-90.9) | 100.0 (88.8-100.0) |
| >5.5228 | 80.0 (67.0-89.6) | 100.0 (88.8-100.0) |
| >6.0666 | 78.2 (65.0-88.2) | 100.0 (88.8-100.0) |
| >6.2092 | 76.4 (63.0-86.8) | 100.0 (88.8-100.0) |
| >6.4716 | 74.6 (61.0-85.3) | 100.0 (88.8-100.0) |
| >6.6813 | 72.7 (59.0-83.9) | 100.0 (88.8-100.0) |
| >6.7303 | 70.9 (57.1-82.4) | 100.0 (88.8-100.0) |
| >7.6353 | 69.1 (55.2-80.9) | 100.0 (88.8-100.0) |
| >7.6689 | 67.3 (53.3-79.3) | 100.0 (88.8-100.0) |
| >7.7241 | 65.5 (51.4-77.8) | 100.0 (88.8-100.0) |
| >7.8333 | 63.6 (49.6-76.2) | 100.0 (88.8-100.0) |
| >7.8339 | 61.8 (47.7-74.6) | 100.0 (88.8-100.0) |
| >8.1689 | 60.0 (45.9-73.0) | 100.0 (88.8-100.0) |
| >8.6772 | 58.2 (44.1-71.3) | 100.0 (88.8-100.0) |

TABLE 4-continued

| | Sensitivity | Specificity |
|---|---|---|
| >8.7232 | 56.4 (42.3-69.7) | 100.0 (88.8-100.0) |
| >9.0836 | 54.6 (40.6-68.0) | 100.0 (88.8-100.0) |
| >9.1086 | 52.7 (38.8-66.3) | 100.0 (88.8-100.0) |
| >9.4822 | 50.9 (37.1-64.6) | 100.0 (88.8-100.0) |
| >9.6362 | 49.1 (35.4-62.9) | 100.0 (88.8-100.0) |
| >9.684 | 47.3 (33.7-61.2) | 100.0 (88.8-100.0) |
| >10.0798 | 45.5 (32.0-59.4) | 100.0 (88.8-100.0) |
| >10.3296 | 43.6 (30.3-57.7) | 100.0 (88.8-100.0) |
| >10.4174 | 41.8 (28.7-55.9) | 100.0 (88.8-100.0) |
| >10.563 | 40.0 (27.0-54.1) | 100.0 (88.8-100.0) |
| >10.9716 | 38.2 (25.4-52.3) | 100.0 (88.8-100.0) |
| >11.0733 | 36.4 (23.8-50.4) | 100.0 (88.8-100.0) |
| >12.1292 | 34.6 (22.2-48.6) | 100.0 (88.8-100.0) |
| >12.5415 | 32.7 (20.7-46.7) | 100.0 (88.8-100.0) |
| >13.5315 | 30.9 (19.1-44.8) | 100.0 (88.8-100.0) |
| >13.5537 | 29.1 (17.6-42.9) | 100.0 (88.8-100.0) |
| >14.0947 | 27.3 (16.1-41.0) | 100.0 (88.8-100.0) |
| >14.9991 | 25.5 (14.7-39.0) | 100.0 (88.8-100.0) |
| >15.2186 | 23.6 (13.2-37.0) | 100.0 (88.8-100.0) |
| >15.5085 | 21.8 (11.8-35.0) | 100.0 (88.8-100.0) |
| >16.1146 | 20.0 (10.4-33.0) | 100.0 (88.8-100.0) |
| >16.982 | 18.2 (9.1-30.9) | 100.0 (88.8-100.0) |
| >17.2568 | 16.4 (7.8-28.8) | 100.0 (88.8-100.0) |
| >17.7788 | 14.6 (6.5-26.7) | 100.0 (88.8-100.0) |
| >19.0558 | 12.7 (5.3-24.5) | 100.0 (88.8-100.0) |
| >19.4384 | 10.9 (4.1-22.2) | 100.0 (88.8-100.0) |
| >22.197 | 9.1 (3.0-20.0) | 100.0 (88.8-100.0) |
| >22.732 | 7.3 (2.0-17.6) | 100.0 (88.8-100.0) |
| >23.6702 | 5.5 (1.1-15.1) | 100.0 (88.8-100.0) |
| >23.8518 | 3.6 (0.4-12.5) | 100.0 (88.8-100.0) |
| >24.0428 | 1.8 (0.05-9.7) | 100.0 (88.8-100.0) |
| >25.3023 | 0.0 (0.0-6.5) | 100.0 (88.8-100.0) |

TABLE 5

| optimal cut off ATG5/protein | control | disease | sensitivity (95% CI) | specificity (95% CI) | AUC (95% CI) |
|---|---|---|---|---|---|
| ≤4.002023 | 29 | 3 | 94.6 (84.9-98.9) | 93.6 (78.5-99.2) | 0.98 (0.97-1.00) |
| >4.002023* | 2 | 52 | | | |

*optimal cut-off value can be determined using ROC curve analysis (with youden index)

As described above, the preferred embodiments were focused for the present invention. It will be understood by those of ordinary skill in the art to which the present invention belongs that the present invention may be embodied in various forms without departing from the essential characteristics of the present invention. Thus, the disclosed embodiments should be considered in an illustrative rather than a restrictive viewpoint. It should be construed that the scope of the present invention is set forth in the following claims rather than the foregoing description, and the present invention includes all differences within the scope of equivalents thereof.

What is claimed is:

1. A method for screening a therapeutic agent for Sjogren's syndrome dry eye, comprising: treating a biological sample obtained from a patient with Sjogren's syndrome dry eye with a test substance; analyzing the effect of the test substance on the expression level of at least one selected from the group consisting of ATG5 gene and LC3B-II gene; and selecting the test substance that decreases the expression level of the gene compared to a control as the therapeutic agent for Sjogren's syndrome dry eye.

2. The method of claim 1, wherein measuring the expression level of the gene is performed by one method selected from the group consisting of reverse transcription polymerase chain reaction, competitive polymerase chain reaction, real-time polymerase chain reaction, nuclease protection assay (RNase, S1 nuclease assay), in situ hybridization, DNA microarray, northern blotting, western blotting, enzyme linked immune sorbent assay (ELISA), radioimmunoassay, immunodiffusion, immunoelectrophoresis, tissue immunohistochemical staining, immunoprecipitation assay, complement fixation assay, fluorescence-activated cell sorting (FACS), mass spectrometry, and protein microarray.

3. The method of claim 1, wherein measuring the expression level of the gene is performed by measuring the level of ATG5 mRNA or LC3B-II mRNA, the level of ATG5 protein or LC3B-II protein, or a conversion ratio of LC3B-II/LC3B-I.

4. The method of claim 1, wherein the biological sample is obtained from subject's tears, a conjunctival epithelial cell, a lacrimal gland, saliva, or a salivary epithelial cell.

5. A method of measuring the expression level of ATG5 or LC3B-II in a patient with Sjogren's syndrome dry eye, comprising: collecting tears from the patient with Sjogren's syndrome dry eye; and measuring the expression level of ATG5 or LC3B-II protein by contacting the tears with anti-ATG5 or anti-LC3B-II antibody and measuring binding affinity between the protein and the antibody, or measuring the expression level of at least one selected from the group consisting of ATG5 gene and LC3B-II gene by using a primer or a probe that selectively binds to ATG5 or LC3B-II mRNA isolated from tears.

* * * * *